INVENTORS
FOREST J. DYNAN
RICHARD G. WHITNAH
BY
Roy M. Pitts
ATTORNEY

Oct. 29, 1968  F. J. DYNAN ET AL  3,408,647
AMTI RADAR SYSTEM
Filed Aug. 18, 1964  9 Sheets-Sheet 2

INVENTORS
FOREST S. DYNAN
RICHARD G. WHITNAH
BY
Roy M. Pitts
ATTORNEY

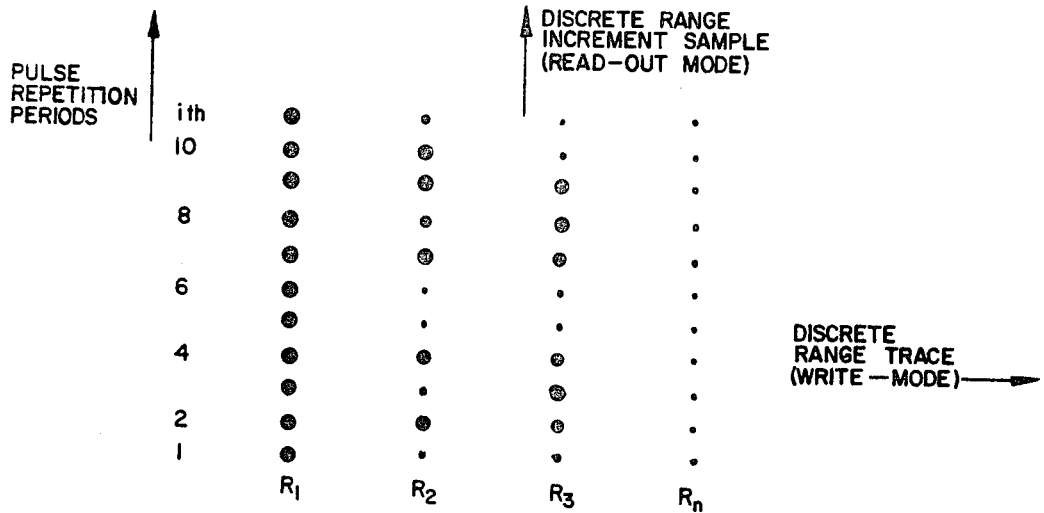
FIG. 3
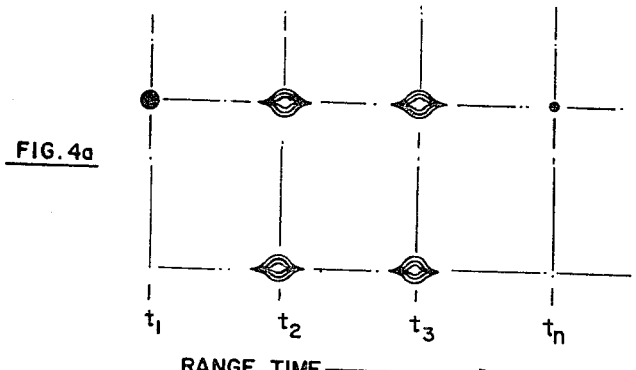
FIG. 4a
FIG. 4b

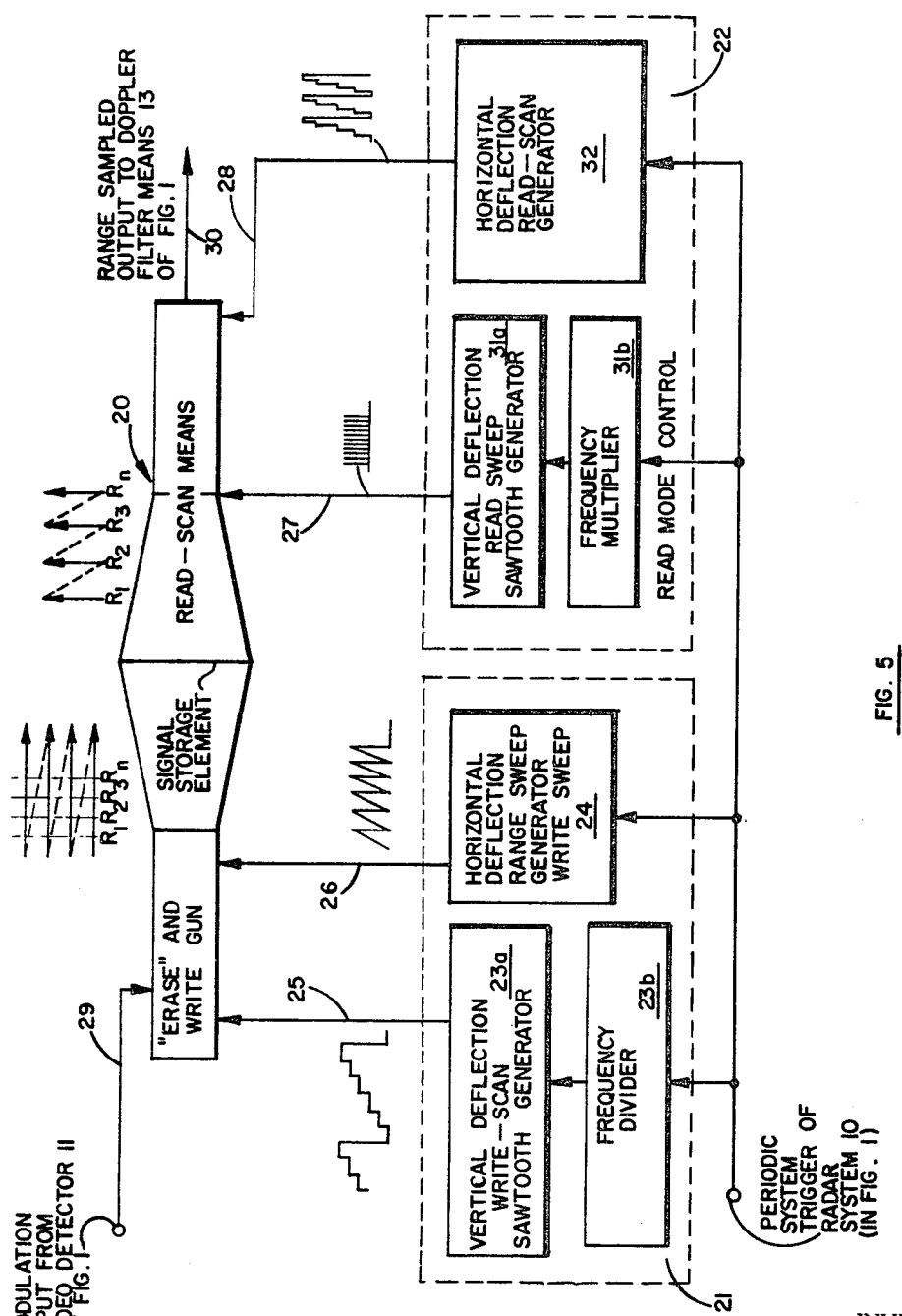

INVENTORS
FOREST J. DYNAN
RICHARD G. WHITNAH
BY

ATTORNEY

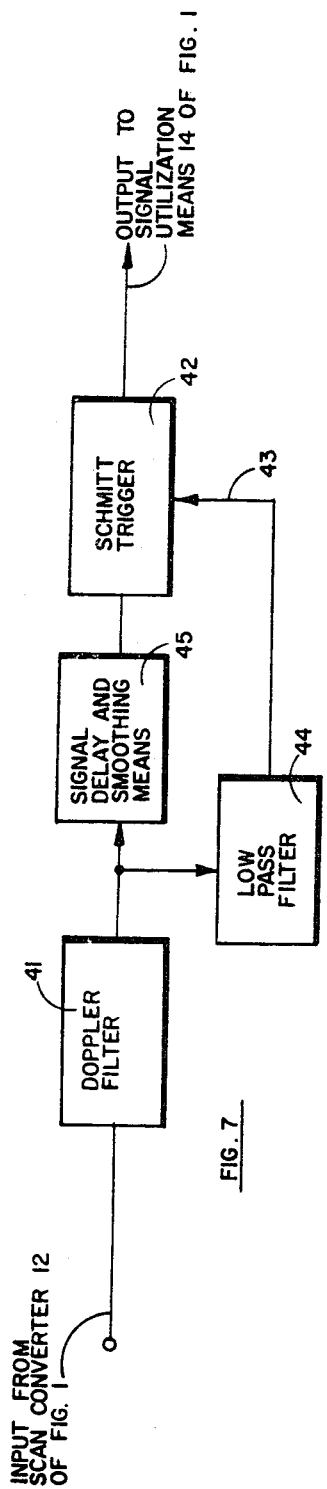
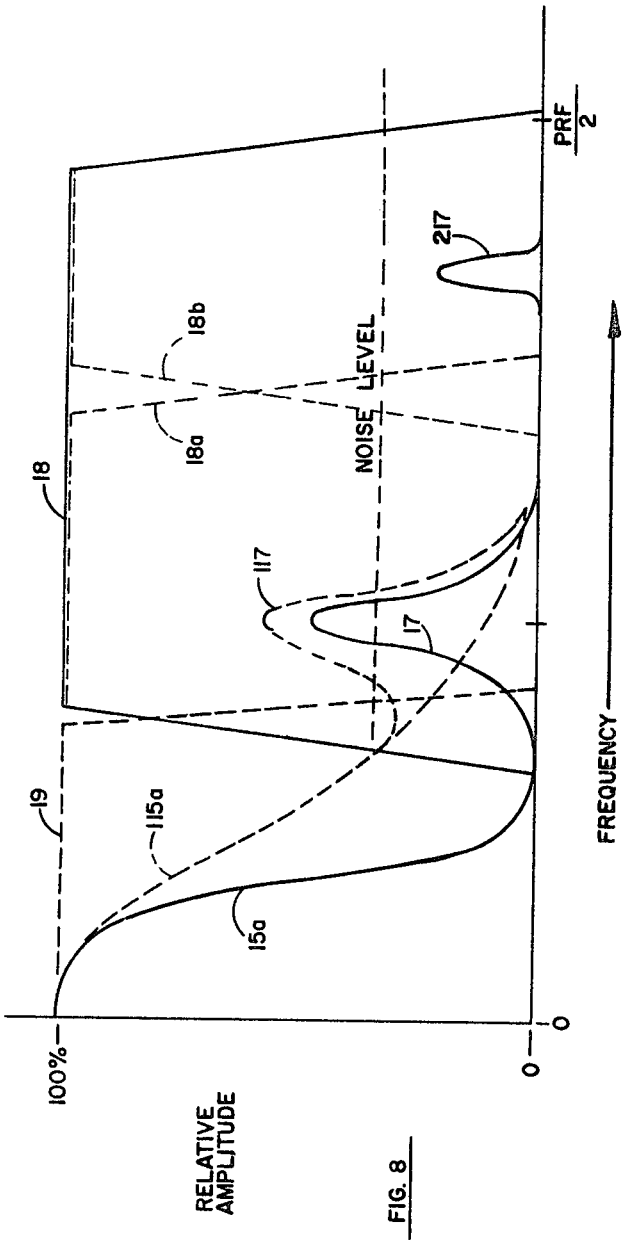

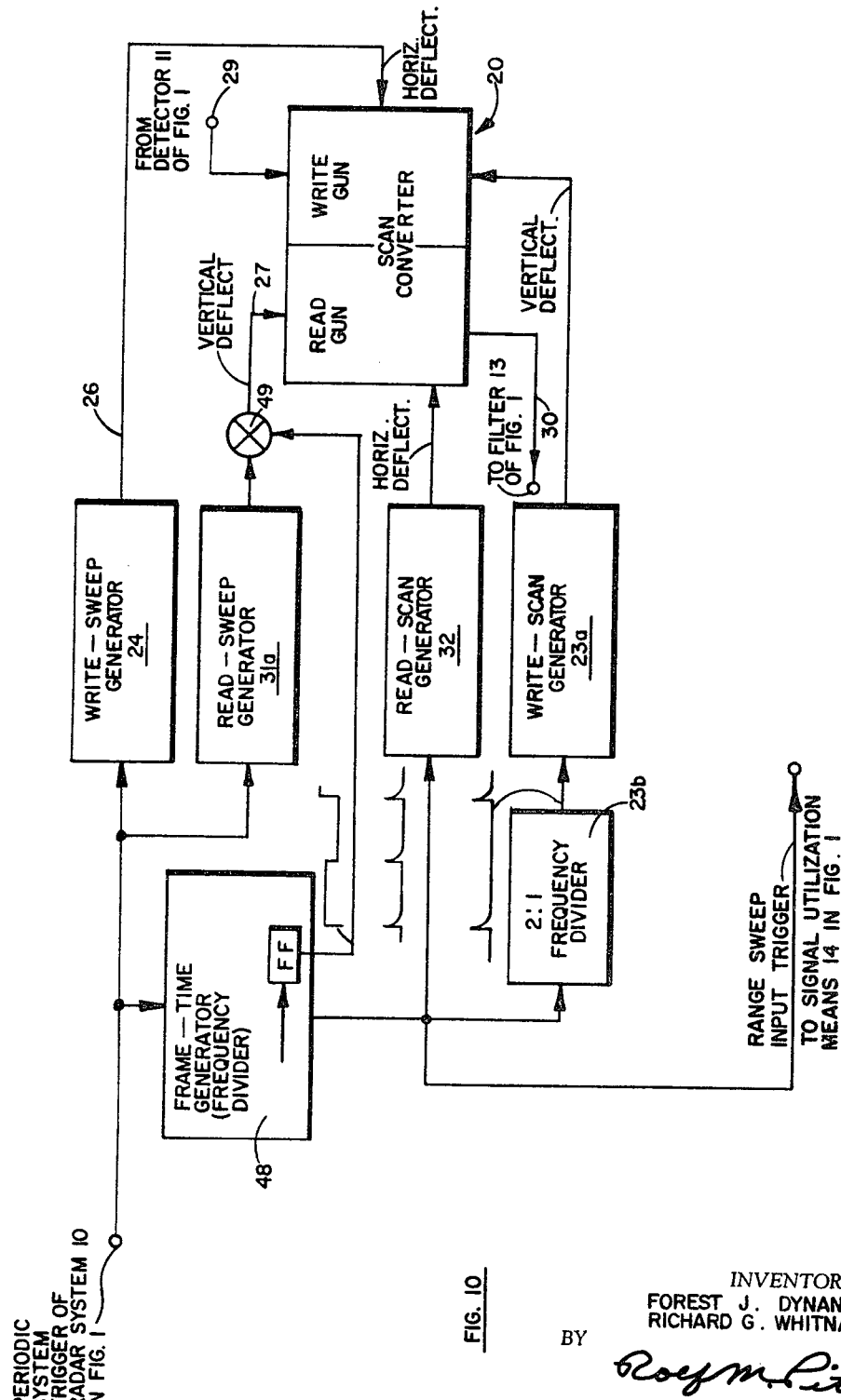

３,408,647
Patented Oct. 29, 1968

3,408,647
AMTI RADAR SYSTEM
Forest J. Dynan, La Mirada, and Richard G. Whitnah, Garden Grove, Calif., assignors to North American Rockwell Corporation, a corporation of Delaware
Filed Aug. 18, 1964, Ser. No. 391,073
16 Claims. (Cl. 343—7.7)

The subject invention relates to a moving target indicating radar system, and more particularly to a clutter-referenced radar receiver having improved ability both to distinguish small targets from radar noise, and to further distinguish small moving targets from ground clutter.

In the airborne application of radar systems to the detection of targets, it is often necessary to detect and locate small moving targets against a clutter background. Examples of such applications are the detection of moving targets such as low-flying aircraft and self-propelled surface vehicles, where the radar return is comprised of components representing the terrain and the target moving relative to the terrain. That component of the signal return occurring due to the terrain is referred to as ground clutter. Another example of such application is the detection of the elevated periscope of a submerged submarine cruising in a heavy sea.

A small target is defined as one having an angular extent smaller than the antenna beamwidth and which provides an echo or return signal having an amplitude which is small relative to noise or other random-appearing signals received by the radar receiver, but which small target itself is not random in occurrence. One means of improving the signal-to-noise ratio of such small target signals is to additively combine the return signals received between successive pulses of a pulsed radar and corresponding to successive range traces for a given direction of interest. The prior art means for effecting such improvement in the signal-to-noise ratio performance are tapped delay lines, wherein input signals thereto are delayed by successive integer multiples of the radar system pulse repetition interval, and the delayed signals additively combined. In this way, the recurring target signals for a target at a given range combine (or are integrated) to provide an improved target signal, while the random-appearing signals or radar noise tend to be mutually cancelling, whereby the signal-to-noise ratio is improved.

An alternative to the tapped delay line signal-integrating technique is the use of a scan-converter in which a selected number of range traces are displayed in a parallel array on a storage-type cathode ray tube, and then combined by optical means to provide a signal range trace input to a vidicon or like optical scanning means for scanning the combined, single range trace to provide a time-varying signal. Both the tapped delay line and scan-converter type of signal-integrating means are more fully described in U.S. Patent No. 3,113,311 issued Dec. 3, 1963, to Searle and Henderson for a Radar Integrating System. While such signal-integrating techniques enhance the signal-to-noise ratio of small stationary targets, they do not provide means for quickly distinguishing a moving target from ground clutter.

Several effective coherent radar techniques have been employed in the prior art for distinguishing a moving target relative to a stationary target or ground return. [A characteristic feature of such prior art coherent MTI radar is that the transmitted signal must be coherent (in phase) with the reference signal in the receiver, as discussed for example at page 117 of "Introduction to Radar Systems" by Skolnik, published by McGraw-Hill (1962).] One such coherent radar technique is the delay line canceler which acts as a filter to (1) eliminate a D-C component in a bi-polar video detected (phase-detected) receiver signal occurring due to fixed targets, and (2) pass an A-C component occurring due to moving targets. In such an arrangement, the video portion of the received signal is divided into two channels, one of which is delayed relative to the other by one pulse repetition interval (e.g., $\Delta t_d = 1/PRF$, where $\Delta t_d$ is the delay amount and PRF is the pulse repetition frequency); and the two video channels then subtractively combined. In this way, the fixed targets with unchanging amplitudes from pulse-to-pulse are cancelled. However, the variable amplitudes of the moving target signals are not constant from pulse-to-pulse, and provide an uncancelled residue.

An exemplary mechanization of such prior-art delay line canceller technique is described and illustrated, for example, in Sections 4.1 and 4.2 of Chapter 4 of the above referenced "Introduction to Radar Systems" by Skolnik.

A disadvantage of such technique is the complexity required to achieve a desired filter characteristic in order to distinguish the Doppler spectra of a moving target from the ground clutter spectra. Another disadvantage is the need for maintaining perfect adjustment in the delay lines in order that the theoretical performance of such filter technique can be approached in practice.

Another MTI technique employs a plurality of range gates and associated filters. The radar range return signals are range-gated or separated into mutually exclusive range intervals. The output of each range gate thus provides a sampled output signal corresponding to the return from only one range increment. Each range-sampled signal is then filtered to attenuate the ground clutter spectra and pass the Doppler spectra associated with a detected moving target. Hence, a plurality of sets of filter and range-gate are employed for a range interval of interest, as is illustrated for example, in FIG. 4.41 at page 152 of the above referenced "Introduction to Radar Systems" by Skolnik. A disadvantage of such range-gated filter technique is the increased complexity over that of the delay line canceller technique to achieve a desired degree of range resolution over a range interval of interest, the range resolution being limited by the number of sets of range-gate and filter employed.

Although the above described MTI techniques have been described as cooperating with a coherent radar, other types of radar may be used in cooperation with the above described MTI techniques, such as pulse Doppler radar and non-coherent radar systems, discussed at pages 153 to 155 of the above referenced text, "Introduction to Radar System." (Such additional types, however, demonstrate inherent performance limitations.)

The above described prior art MTI techniques have considered the utilizing radar as a stationary radar, wherein the received spectral content due to ground clutter is essentially the same as the transmitted pulse and only the spectral content of the received signal due to the moving target is Doppler-shifted. Where, however, the utilizing radar is mounted on a moving platform such as a high-speed aircraft, the received clutter spectra undergoes a Doppler shift in a manner similar to any other target which maintains a relative velocity relative to the radar platform. In other words, both the clutter spectra and moving target spectra will be commonly frequency-translated, or Doppler-shifted, as a function of the platform velocity.

In the prior art of airborne moving target indicators (AMTI) employing coherent radars (in which the receiver comprises a phase detector responsive to the phase of the transmitted energy), the frequency of a coherent oscillator (COHO) is shifted to compensate for the Doppler shift of the clutter spectra (and the target spectra) due to platform (vehicle) velocity and antenna orientation. In this way, zero-frequency rejection (i.e., high-pass) filters may continue to be employed for clutter rejection. Such compensatory frequency shift is accomplished by mixing the output of the COHO with a signal from a tunable oscillator, the frequency of which is controlled by a calibrated control source responsive to vehicle speed and antenna orientation. In the prior art of pulse-Doppler AMTI radars, a tunable rejection filter is controlled by the control signal source to reject the Doppler-shifted clutter spectra. Such AMTI techniques of a tunable Doppler frequency oscillator and a tunable clutter rejection filter are more fully described at pages 155 to 162 of the above referenced "Introduction to Radar Systems." An obvious disadvantage of such approaches is the inherent performance limitation where, for a relatively broadbeam pattern in elevation, the angle to the illuminated clutter patch changes with range over the pulse repetition interval. Such effect causes the Doppler frequency of the ground clutter to vary considerably over the range interval of interest, and makes Doppler compensation extremely difficult. In other words, the normal dynamic (or speed of response) limitations on the controlled signal source and controlled elements provide only limited Doppler compensation.

By means of the concept of the subject invention, an improved airborne moving target indicator is provided, while avoiding the above described disadvantages of the prior art.

According to the concept of the subject invention, received signals indicative of a small moving target are processed over several pulse repetition intervals to enhance the detectability of such moving targets. Such processing reconstructs the spectral content of such moving target signal which is distinguished from background clutter spectra by frequency-responsive means employing only a single Doppler filter chain for all ranges of interest.

In a preferred embodiment of the invention there is provided a non-coherent pulsed radar system adapted for airborne use. Unipolar video detection means is responsively coupled to the radar receiver for providing a clutter-referenced periodic range trace signal. There is also provided a scan converter responsively coupled to the video detection means and arranged for scan-writing a selected number of the range trace signals in a parallel array and then scan-reading the array in a direction orthogonal to the direction of the scan writing. There is further provided a single Doppler filter chain responsively connected to the output of the scan converter and having a high frequency bandpass characteristic, the upper frequency of which preferably does not exceed a frequency corresponding to one-half the pulse repetition frequency of the system trigger.

In normal operation of the above described arrangement, the unipolar video detection means provides a video signal, the D-C or zero frequency of which is indicative of the largest spectral component of the received spectra, where such largest component is due to the ground clutter. The ground clutter energy is indicated by such zero frequency component, and the beat frequency occurring between the ground clutter spectrum and moving target spectrum is indicated as a frequency corresponding to the difference therebetween. Hence, the output of the unipolar video detection mean is referred to as a clutter-referenced signal. A selected number of the clutter-referenced range trace video signals are range-sampled or scanned at successive range increments by the scan converter. Therefore, the scan converter provides a range-sampled signal for successive range increments and having a clutter-referenced spectral content indicative of the clutter and Doppler-shifted moving target components of echo signals received from a specifically sampled range. The limited bandpass of the Doppler filter rejects the zero frequency or low frequency clutter spectra to provide a periodic signal corresponding to an improved range trace signal indicative of the range of moving targets whose Doppler shifts lie within the Doppler filter bandpass. Signals utilization means may then be employed to provide an improved indication of the range and direction of a moving target.

By means of the above described arrangement, signal processing is effected over the selected number of range signal traces for each sampled range, whereby the radar signal-to-clutter performance is improved. Also, the frequency translation of the received spectra to a clutter referenced spectra by unipolar video detection avoids the necessity for, and limited performance of, Doppler compensation control means for compensation of platform motion. Further, the range-sampling technique of the scan-converter limits the clutter content at each sampled range whereby a Doppler filter may be more effectively employed at each sampled range to reject the clutter spectra. Moreover, the use of a scan converter having mutually orthogonal read and write scanning modes preserves or reconstructs the spectral content of the clutter-referenced range trace signals at each sampled range whereby only a single Doppler filter need be employed. In other words, range resolution of the AMTI performance is not affected by use of a single filter for all sampled ranges of interest. Accordingly, an object of the subject invention is to provide improved means for detecting small moving targets.

It is another object of the subject invention to provide range-sampling means for improving the detection of small targets.

It is still another object of the subject invention to provide range-sampling means employing a single Doppler filter for distinguishing moving targets at all ranges of interest.

It is yet another object of the invention to provide clutter-referenced radar signalling means employing a single Doppler filter for distinguishing a moving target over a range of velocities of a moving platform on which said radar means is mounted.

It is a further object of the subject invention to provide clutter-referenced signalling means employing a scan converter to provide both signal enhancement and reconstruction of a clutter-referenced signal spectrum for a periodic signal occurring over a selected number of radar range-trace signals.

It is a still further object of the invention to provide means for distinguishing a selected spectral component of periodic signals employing scan-converting means in cooperation with filter means having a bandpass corresponding to said selected spectral component.

These and other objects of the invention will become apparent from the following description taken together with the accompanying drawings in which:

FIGURE 1 is a block diagram of a system employing the concept of the invention.

FIGURES 2a, b, c and d are a family of the spectral responses of several of the elements of FIGURE 1.

FIGURE 3 is an illustration of the data matrix processed by the mutually orthogonal read and write scanning modes of the scan converting means of FIGURE 1.

FIGURES 4a and 4b are respective representative range trace signal inputs to, and the corresponding output signals from the Doppler filter means of FIGURE 1.

FIGURE 5 is a schematic arrangement of one embodiment of the scan converting means of FIGURE 1.

FIGURE 7 is a block diagram of a preferred arrangement for the Doppler filter of FIGURE 1.

FIGURE 8 is a family of spectral responses relating to the arrangement of FIGURE 7.

FIGURE 10 is a block diagram of a preferred embodiment of the scan converting means of FIGURE 1.

In the figures, like reference characters refer to like parts.

Figure 1:
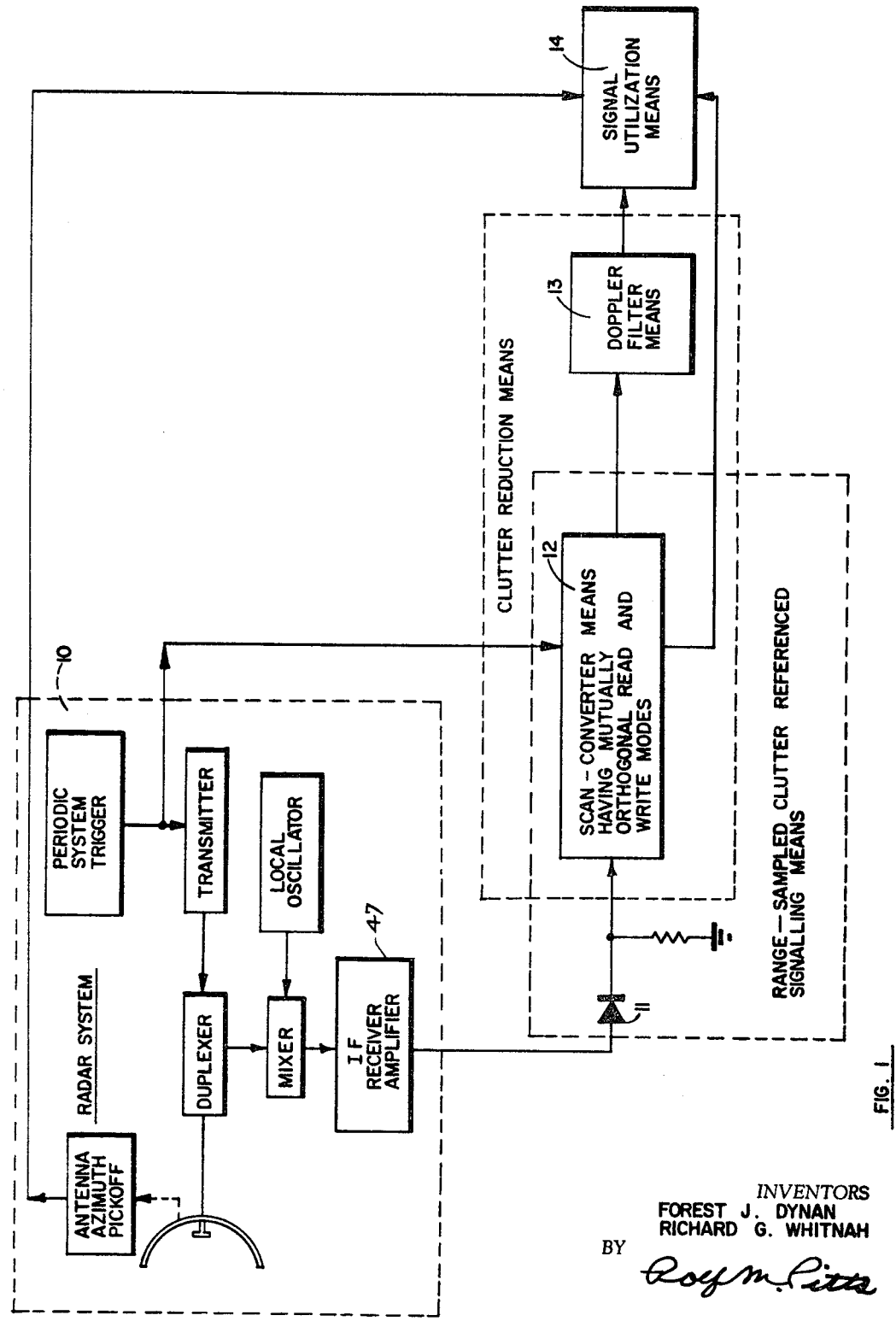

Referring now to FIGURE 1, there is illustrated a block diagram of a radar system employing the concept of the invention. There is provided a radar transmitting and receiving system 10, a unipolar detector 11 responsive to the receiver of radar system 10, a scan-converter means 12 responsive to diode detector 11 and the system trigger of radar system 10. There is also provided Doppler filter means 13 responsively coupled to the output of scan-converter means 12, and signal utilization means 14 coupled to filter means 13 and radar system 10.

Radar system 10 is preferably of the non-coherent type, the construction and arrangement of which are well-known in the art, and may also include an IF amplifier stage or IF strip, as is also well understood in the art. Accordingly, radar system 10 is shown in block form only.

Scan-converter means 12 is comprised of a high-speed scan-converter device arranged to provide a "writing" or display of a preselected plurality of successive radar range traces as a parallel array and then sequentially "reading" or sequentially scanning the array in a direction orthogonal to the "write" direction over a given portion of each range trace (and representing a given range increment), for successive range increments until the frame or entire array has been scanned, as will be explained more fully hereinafter. In other words, the "read" and "write" scans of scan-converter means 12 are each parallel arrays, and are mutually orthogonal.

Doppler filter means 13 comprises a selective bandpass device for processing the cyclical output of scan-converter means 12 to provide a periodic range trace signal of targets lying within a selection range of ground velocities, as will be explained more fully hereinafter. Because scan-converter means 12 and Doppler filter means 13 are more fully described hereinafter, such elements have been illustrated in block form in FIGURE 1 for convenience only. Signal utilization means 14 may be any signal responsive indicator for providing a display of the range and direction of a source of a periodic echo signal, as is well understood in the art. Therefore, utilization means 14 is shown in block form only.

The operation of the system may be more fully appreciated from a consideration of FIGURES 2 and 3.

Figure 2A:
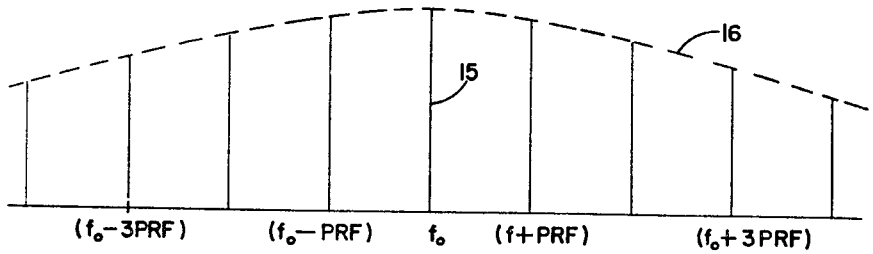

In normal operation of the arrangement of FIGURE 1, pulsed radar system 10 transmits pulses of radar energy having a selected carrier frequency $(f_0)$, pulse-width $(X)$ and pulse repetition frequency (PRF). The spectral content of such transmitted pulsed energy is illustrated in FIGURE 2a as a spectral line 15 occurring at the carrier frequency $f_0$ and spaced apart (above and below) from $f_0$ by integer multiples of the pulse repetition frequency (PRF), and having an amplitude envelope 16 described by the curve $(\sin X)/X$, defined by the pulsewidth $(X)$.

Figure 2B:
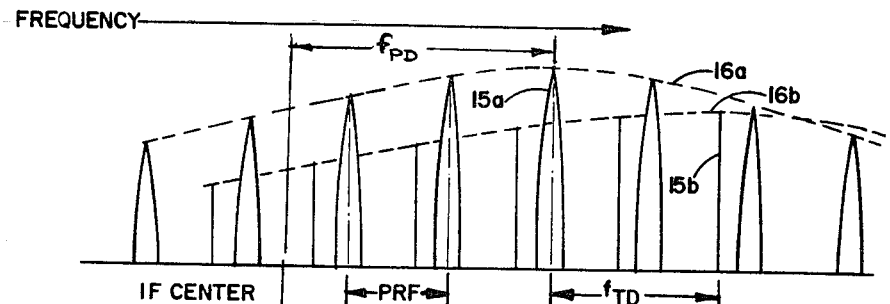

The received spectrum of frequencies, translated in frequency by an IF receiver stage 47 of the radar system 10 of FIGURE 1, is shown in FIGURE 2b, the IF center frequency corresponding to the carrier frequency $f_0$. In other words, that portion of the received spectrum comprising energy at the carrier frequency $(f_0)$ is represented in FIGURE 2b at the IF center frequency, and spectral components of the received energy occurring above and below the carrier frequency $(f_0)$ are shown in FIGURE 2b as similarly occurring above and below the IF center frequency. The IF spectral lines of the receiver energy as seen to be illustrated in FIGURE 2b by two envelopes. The first and larger envelope 16a represents the return due to a substantial amount of ground clutter, and has a center frequency or main cusp 15a corresponding to the transmitted central spectral line 15 of FIGURE 2a and shifted from the radar receiver IF center frequency by an amount $(f_{PD})$ corresponding to the Doppler shift provided by the platform motion (vehicle speed) relative to the point scatterers of the terrain. A cusp or frequency spread occurs about the spectral lines due to the variation of Doppler shift contributed by variations in direction of all the terrestial point scatterers within the beamwidth of the antenna. The spectral lines above and below the received central cusp 15a and comprising envelope 16a of FIGURE 2b (corresponding to the spectral lines above and below the transmitted spectral line 15 of FIGURE 2a) are similarly Doppler-shifted by an amount corresponding to the vehicle motion (e.g., radar system motion) relative to the terrain.

Also shown in FIGURE 2b is a lesser envelope 16b, representing the lesser energy return from a small moving target occurring within the beamwidth of the radar system 10 of FIGURE 1, and having a center spectral line 15b corresponding to the center cusp 15a of the clutter envelope 16a, but shifted in frequency therefrom by an amount $(f_{TD})$ corresponding to the Doppler-shift occurring due to the motion of the target relative to the ground. The spectral elements comprising the moving target spectral envelope 16b are shown as lines, and not cusps, because the narrow angular extent of the small moving target relative to that of the antenna beamwidth limits the spectral response resulting from the target return echo, relative to that provided by the clutter return from the ground.

Figure 2C:
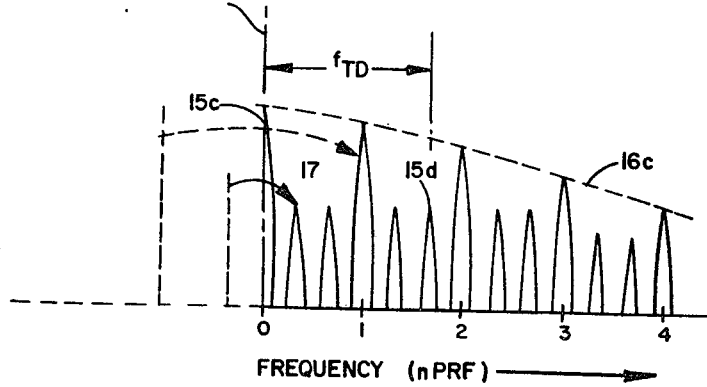

The combined spectral response of the IF receiver stage 47 of radar system 10 (envelopes 16a and 16b of FIGURE 2b) is then half-wave rectified or detected by the diode detector 11 (of FIGURE 1), as shown in FIGURE 2c. The effect of such unipolar video detection is to provide a folded spectrum, folded about the main cusp of the larger ground-clutter spectrum. In other words the center frequency of cusp 15a of the IF ground-clutter spectrum (of envelope 16a in FIGURE 2b) corresponds to the D-C or zero frequency component of the video detector output shown in FIGURE 2c; and the ground-clutter envelope 16a (of FIGURE 2b) is folded back upon itself about cusp 15a, which cusp frequency is translated to D-C zero frequency as spectral component 15c in FIGURE 2c. Hence, the convolved clutter spectrum is represented by envelope 16c in FIGURE 2c.

Similarly, video detection causes the IF moving target spectrum (envelope 16b of FIGURE 2b) to be folded about the center frequency of IF ground-clutter cusp 15a (which clutter cusp is frequency translated as D-C component 15c in FIGURE 2c), and provides lesser cusps corresponding to the beat-frequency differences between the moving target spectrum and the ground clutter spectrum, which effect is referred to as the convolution of the combined target and ground clutter spectra.

This effect, of the half-wave detection of a composite A-C carrier signal, having a large amount of energy modulated at one frequency and a lesser amount of energy modulated at a second frequency, to provide a detected signal having a D-C component corresponding to the larger energy source, and an A-C component indicative of the lesser energy source and having a frequency indicative of the beat frequency difference between the two sources, has been observed in the art. See, for example, pages 460–461 of "Radio Engineering" by Terman, 2nd edition (McGraw-Hill, 1937).

The frequency difference between the convolved ground clutter spectral cusp 15c and the convolved moving target center cusp 15d in FIGURE 2c is the same as the Doppler frequency difference $f_{TD}$ observed between the IF ground-clutter center cusp 15a and the IF moving-target spectral line 15b in FIGURE 2b. However, because the center of the clutter spectrum has been folded about zero frequency by the process of unipolar video detection of a noncoherent received signal, the actual frequency of the convolved moving-target cusp 15d (in FIGURE 2c) is the true observed Doppler frequency of the moving target (relative to the terrain). Because zero frequency now represents the center of the ground clutter spectrum, the true Doppler frequency of the moving target relative to the ground clutter may be directly observed as the center frequency at which the convolved moving-target central cusp 15d occurs. In fact, any spectral component 17 observed between the zero frequency clutter cusp 15c and the clutter cusp occurring at a frequency corresponding to the system PRF may be identified as a spectral component indicating the existence of a moving target. Further, the unipolar video-detected ground-clutter cusp 15c will always be convolved about zero frequency or D-C, regardless of the nature of, or changes in, platform motion or antenna orientation, whereby the moving target clutter spectrum (below one PRF) may be distinguished therefrom. Hence, such spectral indication is referred to herein as a clutter-referenced airborne moving target indication. The means by which the moving-target signal (for a given range increment) lying outside the ground clutter spectra is distinguished from the ground clutter return, is indicated in FIGURE 2d.

Where the interval of radar ranges for which received echo signals are processed, is extensive the strength of the received signals will vary considerably, requiring a data processor having a corresponding dynamic signal range. Such data processor dynamic signal range requirement may be attenuated by the use of receiver signal compression techniques such as the use of logarithmic receivers in radar system 10 (of FIGURE 1). It has been observed, for example, that a logarithmic receiver providing a gain compression of three-to-one has very little significant effect upon the spectral power distribution of the received signals.

Figure 2D:
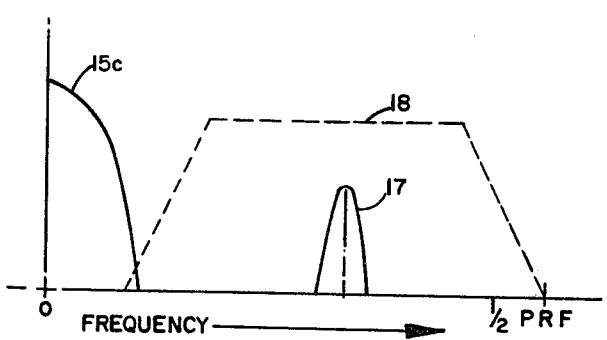

Referring to FIGURE 2d, that portion of the spectrum of FIGURE 2c between zero frequency and one-half the pulse repetition frequency, is represented. Such representation includes the zero-frequency or low-frequency ground clutter cusp 15c and that one 17 of the convolved moving-target beat-frequency cusps occurring below one-half the pulse repetition frequency. By means of a bandpass filter, the bandpass 18 of which is substantially above the frequency region of the ground clutter spectrum 15c; (of FIGURE 2c) and below one-half the pulse repetition rate, only Doppler spectral components due to target motion relative to and outside of the ground clutter spectrum (such as cusp 17) are passed, other signals being attenuated or suppressed. The reason for limiting the upper bandpass limit of such filter bandpass to one-half the pulse-repetition period is to avoid passing spectral components due to the sampling frequency or pulse repetition period itself, as is well understood in the art of sampled data systems.

Such bandpass characteristic 18 (of FIGURE 2d) for selectively filtering the data at each range increment of interest, is provided by Doppler filter means 13 (of FIGURE 1), as will be more fully explained hereinafter. However, the range gating of the data to provide range-gated samples of data to be filtered for successive range increments, is provided by the scan converter means 13 (of FIGURE 1), in the manner shown in FIGURE 3.

Referring to FIGURE 3, there is illustrated a representation of the mutually orthogonal "read" and "write" modes of the scan converter means 12 (of FIGURE 1). There is displayed a parallel array of a selected number of horizontal range traces, each trace representing a display (running from left to right, as illustrated) of the signal intensity of radar echoes delayed in accordance with the range R at which such echoes originate, for a mutually exclusive one of successive pulse repetition periods of the radar system 10 (of FIGURE 1). Such parallel array of a a selected number of horizontal traces is referred to herein as the "write" or storage mode of the scan converter.

The comparative size of the illustrated display dot for a selected range and pulse repetition period correspond to the strength of the received radar echo from such range during that pulse repetition period. For example, at the near-range $R_1$, the displayed signal intensity is relatively strong and, further, is relatively invariant from one pulse repetition period to another (comparing the vertical array of display dots at $R_1$ in FIGURE 3). Such relative invariance in the received signal intensity at range $R_1$ from one pulse repetition period to another is indicative of a D-C signal corresponding to the D-C or low frequency cusp 15c of FIGURE 2d, and representing the ground clutter spectral return. In other words, the D-C or low frequency nature of the unipolar video-detected echo occurring at range-time $R_1$ is determined by sequentially "reading" or range-sampling the $R_1$ data of successive discrete (pulse repetition) periods.

Similarly, the displayed signal intensity of the stored signals at range $R_2$ in FIGURE 3 is observed to vary from one pulse repetition period to another (as seen from a comparative examination of the vertical array of signal intensity "dots" at range $R_2$ in FIGURE 3). Such variation in the signal intensity at range $R_2$ over a period of discrete intervals is indicative of an A-C signal having a spectral content corresponding to the moving-target cusp 17 of FIGURE 2c. Further, because such range-sampled, discretely-varying signal at $R_2$ never goes to zero or a null signal intensity, a D-C ground-clutter component is included in the spectral content, corresponding to the ground-clutter cusp 15c of FIGURE 2d. Hence, by causing the scan converter to sequentially "read" the $R_2$ range data stored for successive pulse repetition periods, the spectral content of such data is restored or reconstructed relative to a clutter reference. Further, the scan converter is made to similarly sequentially read or vertically scan the stored data for each of successive ranges, such as ranges $R_3$ and $R_n$, whereby a parallel array of a selected number of vertical scans is achieved. Such parallel array of vertical scans is referred to herein as a "read" mode. Hence, it is understood that the "read" mode provides range-sampling of the stored range-trace data, and that the "read" and "write" modes of the scan converter are mutually orthogonal. Moreover, the output of the scan converter read-out is a range-trace signal, the spectral content of which changes serially or sequentially in time, to correspond to the clutter-referenced spectral content observed at the successive range intervals sampled, as shown in FIGURE 4a.

Referring to FIGURE 4a, there is shown a time history of the signal intensities of the read-out provided by scan-converter means 12 of FIGURE 1. The symbols at $t_1$, $t_2$, $t_3$ and $t_n$ correspond to signal intensities successively occurring at periodic time delays corresponding to radar ranges $R_1$, $R_2$, $R_3$ and $R_n$. The solid black dot at each of delays $t_1$ and $t_n$ indicates an invariant signal corresponding to the ground clutter spectral cusp 15d of FIGURE 2c. The "butterflies" at each of delays $t_2$ and $t_3$ indicate a time-varying signal corresponding to both the moving target spectral cusp 17 and the ground-clutter spectral cusp 15c of FIGURE 2d. In other words, the cyclical range-trace signals provided by the scan-converter output are delayed by amounts indicative of the ranges of the radar energy-reflecting elements producing such radar echoes, and comprise a varying spectral content which corresponds to the background clutter and moving targets comprising such radar-energy reflecting elements.

By one's applying the output of the scan converter (illustrated in FIGURE 4a) to the Doppler filter 13 (of FIGURE 1) having the selected bandpass 18 shown in FIGURE 2d, the D-C or low frequency (ground clutter) components of the scan-converter output are rejected or attenuated. Hence, a range-trace display of the filter output, shown in FIGURE 4b, will provide no target indication at time delays $t_1$ and $t_2$ (corresponding to ranges $R_1$ and $R_n$, respectively). However, the moving-target spectral components corresponding to the bandpass 18 (in FIGURE 2c) of the bandpass filter will be displayed. Accordingly, a moving target indication will occur at time delays $t_2$ and $t_3$ (corresponding to ranges $R_2$ and $R_3$, respectively) in FIGURE 4b.

Because of the relatively high-frequency component represented by a random signal indication or random variation in the discrete stored and range-sampled scan converter signals due to radar noise, the limited bandpass 18 of the Doppler filter tends also to attenuate radar noise, thereby improving the signal-to-noise ratio, whereby small, non-random targets producing a Doppler shift lying within the Doppler-filter bandpass may be more readily distinguished from background noise.

Hence, it is to be appreciated that the diode detector 11 (of FIGURE 1) responsively connected to the noncoherent receiver 10 and cooperating with the scan-converter 12 provides range-sampled clutter-referenced signalling means. In other words, the cooperation of the diode detector 11 and scan-converter 12 (having mutually orthogonal write-scan and read-scan modes) provides range-sampling at sequential ranges of radar echoes received by a radar system (mounted on a moving platform), the spectral components thereof due to moving targets being indicative of the Doppler shift of such moving targets relative to the terrain and substantially independent of the platform motion of the radar itself.

It is also to be appreciated that the cooperation of scan converter 12 and Doppler-filter means 13 provides clutter-reduction means. In other words, the reconstruction of the clutter-referenced target spectra from the parallel array of stored data by means of the scan-converter read-out mode, and the cooperation of the limited bandpass of filter 13 to reject that component of the reconstructed spectra which is due to ground clutter, provide suppression of the ground-clutter return.

It is to be further appreciated that the mutually orthogonal read and write scanning modes of converter 12 provide range-sampled signal-integrating means, whereby the radar return from a given (sampled) range is determined from processing the radar returns received at such (sampled) range for a selected number of pulse repetition periods.

In one embodiment of the scan-converting means 12 of FIGURE 1, after the selected number of range traces are displayed and an initial read out of the frame (e.g., a sequential scan of all the sampled range increments) is completed, the scan-converter up-dates the recorded data by erasing the oldest (or first) horizontal range trace (PRF number 1, as illustrated in FIGURE 3), and adds or records the next range trace subsequent to the last one recorded (corresponding to PRF number $(i+1)$). Such up-dating of a selected number of pieces of data in a data processor is called the "add one, drop one" process.

Where the radar system 10, in which the scan-converter 12 is employed, is a scanning radar (wherein the antenna thereof cyclically scans in azimuth), then the number of range-traces or pulse repetition data periods stored is limited to that number ($i$) of pulse repetition periods occurring within the length of time it takes the antenna to scan one beamwidth:

$$i = \frac{\Delta\theta}{\dot{\theta}} \times PRF$$

where:

$\Delta\theta$ = antenna beamwidth in azimuth, in degrees
$\dot{\theta}$ = antenna azimuth sweep rate, degrees per second
PRF = radar system pulse repetition frequency, cycles per second.

In this way the maximum "data smear" in the azimuth indication of a point source target would be limited to one beamwidth. For example, for a representative beamwidth of 3°, azimuth sweep rate of 60°/sec., and a PRF of 3,000 pulses/sec., the number ($i$) of sampled pulse repetition periods or range traces would be limited to 150 lines.

The range-resolution of the range-sampling procedure provided by the scan-converting means 12 is limited by the number of range samples employed: the larger the number of range-samples, the smaller is the range increment sampled and the better the range resolution. However, the larger the number of sampled range increments, the larger the number of data elements to be read. Hence, if a real-time display is required (e.g., the several sampled-range increments be scanned in sequence within one pulse repetition period of the system radar), then the "read-out and erase" speed of the scan converter would have to be correspondingly increased with a desired improvement in the range resolution (i.e., increased number of sampled ranges). Alternatively, a scan-converter data rate less than the radar data rate would have to be employed; in other words, the system data rate would be limited by the speed of the scan converter. Range increments of 500 feet are considered satisfactory for the described AMTI application.

An exemplary arrangement of the cooperation between the scan-converter means 15 and system trigger of the radar system 10 of FIGURE 1 is shown in FIGURE 5.

Referring to FIGURE 5, there is illustrated in block diagram form an exemplary arrangement of control means for the scan-converter apparatus of FIGURE 1. There is provided a scan converter or signal storage tube 20 having a write-gun, intensity modulated by the output of unipolar video detector 11 (of FIGURE 1) for writing upon a storage element; and read-out means for scanning and providing a reading-out (to Doppler filter 13 in FIGURE 1) of the data stored on the storage element. Signal storage tube 20 may be either of the optical storage type or electrostatic storage type, the construction and arrangement of an exemplary embodiment thereof being described, for example, in U.S. Patent No. 2,728,020 issued Dec. 20, 1955, to Louis Pensak for a Storage Tube. Other types of tubes are described at pages 50–53 and at pages 58–61 of "Storage Tubes" by Knull and Kazan (John Wiley and Sons, 1952).

Associated with the storage tube 20 are write-mode control means 21 and read-mode control means 22 responsively coupled to the system trigger of the radar system 10 (in FIGURE 1), for providing mutually orthogonal read and write modes in storage tube 20. The write-mode control means 21 is comprised of a write-scan generator 23 and a write-sweep generator 24 operatively coupled to respective ones of the write-gun vertical and horizontal deflection control inputs 25 and 26. The write-sweep generator 24 is merely a ramp or sawtooth generator responsive to the system trigger for providing a horizontal range-trace sweep in synchronism with the pulse repetition periods of the system trigger, as is well understood in the art. The write-scan generator 23 is comprised of a frequency divider 23b responsive to the system trigger for driving a staircase signal generator coupled to incrementally deflect the write-gun horizontally each pulse repetition period of the system trigger. The write gun is thus incrementally deflected on each pulse of the system trigger for a selected number of pulses determined by the amount of frequency division effected and corresponding to the selected number of horizontal range traces (or PRF periods) to be displayed, as shown in FIGURE 3. In practice, however, it has been found just as effective and more economical to employ a sawtooth sweep generator 23a in synchronism with frequency divider 23b.

The read mode control means 22 is comprised of a read-sweep generator 31 and a read-scan staircase generator 32 operatively coupled to respective ones of the read gun vertical and horizontal deflection control inputs 27 and 28. The read-scan staircase generator 32 may be comprised of a frequency multiplier responsive to the system trigger for driving a staircase signal generator for incrementally deflecting the read-gun beam horizontally a selected number of increments each pulse repetition period corresponding to the selected number of vertically scanned, sampled range increments illustrated in FIGURE 3. However, in practice it has been found just as effective and more economical to employ a sawtooth sweep generator 32 constructed and arranged similarly as horizontal write-sweep generator 24. The vertical read-sweep generator is comprised of a sawtooth generator 31a responsive to a frequency multiplier 31b (which, in turn, is coupled to the system trigger) for providing a vertical deflection of the read-gun in synchronism with the frequency multiplier. Hence, the cooperation of the read-gun with the vertical read sweep 31 and horizontal scan 32 provides scanning or successive reading of the range data of a selected number of succession pulse repetition periods, for each sampled range increment of a selected number of successive range increments.

The resulting output on line 30 (in FIGURE 5) is a periodic range trace signal of a variable spectral content, the quality and time occurrence of which is indicative of the type of observed radar return (ground clutter or moving target or both) and the range thereof. The means by which such result obtains may be more conveniently appreciated by reference to the family of scan-converter time-histories shown in FIGURE 6.

Figure 6:
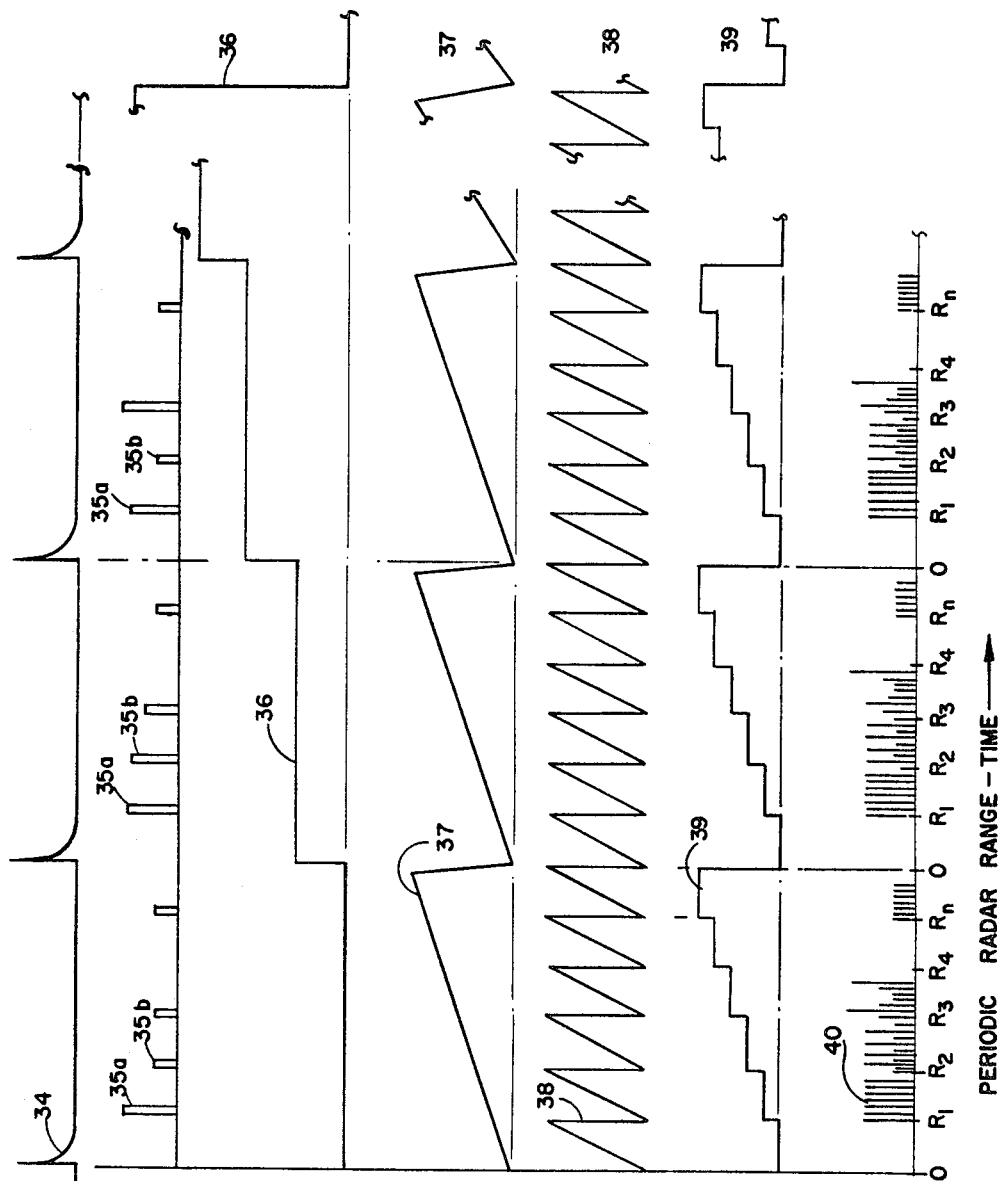
FIGURE 6 is a family of time histories of the responses of several elements of FIGURE 5.

Referring to FIGURE 6, there is illustrated a family of time histories of the scan converter means of FIGURE 5 adapted to cooperate in synchronism with the radar system 10 of FIGURE 1. Curve 34 represents the periodic input from the system trigger of radar system 10 (in FIGURE 1) to the scan-converter control elements 21 and 22. Curve 35 is a discrete representation of the amplitude of the periodic range-trace signal or input on line 29 from video detector 11 (in FIGURE 1). The discrete representation selected for each of the range increments is intended to more conveniently depict that discrete variation in the signal amplitude resulting from the read-scan mode, and corresponds to the parallel array of horizontal range traces shown in FIGURE 3, the discrete amplitudes of curvce 35 corresponding to the discrete intensity dots in FIGURE 3. For example, the relatively fixed amplitude of curve 35 corresponding to the discrete intensity dots in first sampled range $R_1$ in FIGURE 6b, correspond to the vertical array of fixed amplitudes at range $R_1$ in FIGURE 3, while the amplitude of the periodic signals 35b periodically occurring at the second sampled range $R_2$ in FIGURE 6b correspond to the vertical array of cyclically variable amplitudes observed at range $R_2$ in FIGURE 3.

Curve 37 in FIGURE 6 represents the horizontal range sweep input to the write gun from write-gun sweep generator 24, in synchronism with the system trigger 34, and corresponds to the extent of the horizontal deflection of the range traces displayed in FIGURE 3. Curve 36 represents an idealized periodic vertical incremental deflection provided by write gun control element 23. Each incremental step has a deviation of one pulse repetition period in synchronism with the system trigger, the total integer number of steps in the periodic staircase corresponding to the selected number of horizontal range traces in the parallel data array of FIGURE 3. In this way, the orientation of the write gun is successively adjusted vertically for each of a successive number of pulse repetition periods to provide the stored parallel array of horizontal range traces shown in FIGURE 3. Hence, by means of the cooperation of the periodic radar signal input described by curve 35 and the write-gun control inputs described by curves 36 and 37, the data pattern or parallel array of horizontal range traces of FIGURE 3 is generated on the storage element of tube 12 (in FIGURE 5). In actual practice, of course, staircase 36 is actually a ramp provided by a sweep generator having a period equal to a selected integer multiple ($i$) of the pulse repetition period.

Curve 39 of FIGURE 6 represents an idealized periodic horizontal incremental deflection input to the read gun from read gun scan control element 32. Each increment corresponds a range increment to be sampled, the total number of increments (7) in the periodic staircase corresponding to the pulse repetition period or total range interval of FIGURE 3 over which range-sampling is performed. Curve 38 represents the vertical sweep input to the read gun from read-gun sweep control element 31 in synchronism with the steps of the staircase signal (curve 39), the extent of which corresponds to the vertical extent of the array illustrated in FIGURE 3. In this way, the cooperation of the read gun control inputs described by curves 38 and 39, causes the read gun to be successively adjusted horizontally for vertically scanning each of a selected number of successive discrete range increments as illustrated in FIGURE 3. (In actual practice of course, staircase 39 is actually a ramp provided by a sweep generator having a period equal to the pulse repetition period.) Hence, the time history of the output signals produced by such read mode (mutually orthogonal to, and in cooperation with, the write mode) is shown by curve 40.

The vertical scanning of the read gun at the first sampled range $R_1$ (corresponding to the successive scanning of the vertical array of "dots" at $R_1$ in FIGURE 3) provides the fixed amplitude envelope described by curve 40 within the time increment between times $t_1$ and $t_2$. Such envelope of successively scanned signals of fixed amplitude corresponds to the "black dot" or steady intensity indication indicated at range time $t_1$ of the range trace shown in FIGURE 4a, and indicates the absence of a moving target return amid the received ground clutter return from range $R_1$. Similarly, the vertical scanning of the read gun at the second sampled range $R_2$ (corresponding to the successive scanning of the vertical array of "dots" at $R_2$ in FIGURE 3) provides the variable amplitude envelope described by curve 40 within the time increment between time ranges $t_2$ and $t_3$ in FIGURE 6. Such envelope of successively scanned signals of different amplitudes corresponds to the "butterfly" or variable intensity indication indicated at range $R_2$ of the range trace shown in FIGURE 4a, and indicates the presence of a moving target return amid the received ground clutter return from range $R_2$. In a like manner, the respective envelopes of the delayed cyclical signals, subsequent to $t_3$ and $t_n$ and representing the sampled range increments at $R_3$ and $R_n$, may be seen to indicate a moving target and no moving target, respectively.

In conjunction with the described use of sawtooth generators in lieu of idealized staircase generators, the beams of the scan converter are slightly defocussed so as to accomplish the necessary range-sampled read-out, as is well understood in the scan-converter art.

Accordingly, it is to be appreciated that the illustrated embodiment of FIGURE 1 provides clutter-referenced, range-sampled signals in which the clutter from the sampled range comprises the reference for such range, regardless of the platform motion associated with the radar system itself. Also, the amount of clutter present in the range-sampled signal is limited to just the clutter return from the sampled range. Further, because a clutter referenced signal is provided, regardless of the platform motion and sighting angle of the radar system, a fixed bandpass may be employed for Doppler filtering to distinguish a moving target from such clutter. Moreover, only a single Doppler filter is required for processing the clutter-referenced, range-sampled signals for all of the ranges so sampled.

Although Doppler filter 13 has been described as having a preselected bandpass corresponding to the target Doppler frequency to be detected and not exceeding one-half the system PRF, such description is a simplification heretofore provided for convenience in exposition. In actuality, the scan converter 12 provides a frequency translation or multiplicative effect upon the clutter-referenced spectral data fed to Doppler filter 13. The factor by which the data is frequency multiplied is determined as the ratio of the scan-converter periodic write-in scan time (corresponding to the period of curve 36 of FIGURE 6 for write-scan element 23 of FIGURE 5) to the periodic read-sweep time required to read-out the data for a given range increment (corresponding to the period of curve 38 of FIGURE 6 for read-sweep element 31a of FIGURE 5). For example, the periodic time required to write and store the several data samples of each of the selected number ($i$) of successive pulse repetition periods for a given range increment, is equal to the product of the time interval (1/PRF) separating the occurrence of successive data samples and the number ($i$) of such data samples for such range increment. Similarly, the periodic time required to read-out or read-sweep the $i$ pieces of data stored for a given range increment, is equal to the period of the read-sweep generator 31a of FIGURE 5 (indicated as a submultiple ($1/K_r$) of the system pulse repetition period). In other words for the arrangement of FIGURE 1, the read-out frequency $f_r$ is an integer multiple $K_r$ of the system PRF, and the write-scan frequency $f_w$ is a submultiple ($1/i$) of the system PRF.

The ratio $K_f$ of the read-out sweep frequency to the write-scan frequency is equal, of course, to the ratio of the periodic write-scan time to the periodic read-sweep time:

$$K_f = \frac{\text{write scan time}}{\text{read sweep time}} = \frac{K_r PRF}{(1/i)PRF} = iK_r$$

Referring again to FIGURES 3 and 6, it may be demonstrated that the frequency multiplication factor $K_f$ also corresponds to the ratio of the system pulse repetition period (1/PRF) occurring between two successively stored radar signals received from a given range, to the scan-converter read-sweep interval between two such stored signals. In other words, where the read-out speed in sweeping a given range increment (of the data matrix) is greater than the speed at which the data elements for such range increment are received and stored, then the spectral content (other than zero frequency) represented by such data elements will appear at, or will be multiplied to, higher frequencies, the frequency multiplication factor $K_f$ being the ratio of the read-sweep frequency to the write-scan frequency. Therefore, the required bandpass of high-pass filter 13 is similarly shifted.

The above-described Doppler filtering means for providing a signal indicative of a moving target relies substantially upon the bandpass 18 of the Doppler filter 13 being exclusive of the frequencies of the clutter spectra. To so narrow the fixed bandpass or limit the lower corner frequency of the bandpass of the Doppler filter, limits the range of moving-target velocities at which moving targets may be distinguished. However, if the lower corner frequency of the fixed Doppler bandpass 18 were extended to the upper frequency of the clutter spectral cusp 15c (as shown in FIGURE 2d) in order to extend the range of target velocities for which moving targets could be distinguished, then a background clutter energy level would occur in the Doppler filter output. Such background energy level would represent the reduced energy level of the clutter spectra, attenuated by the "skirt" or lower corner frequency response of the Doppler filter bandpass characteristic. Such energy level in the Doppler filter output could also arise due to a spread in the clutter spectra (cusp 15a in FIGURE 2d), caused by increases in the platform velocity and sighting angle of the radar system, as is well understood in the art. Such spread in the clutter spectra is shown in FIGURE 8 by the dotted line 115c with the superimposed moving target spectra 117. A threshold signalling arrangement for removing such energy is shown in FIGURE 7.

Referring to FIGURE 7, there is illustrated a block diagram of an exemplary arrangement of the Doppler filter means 13 of FIGURE 1 for further limiting the clutter energy content occurring in the output of such device. There is provided a variable threshold pulse amplifier such as a Schmitt trigger 42 connected to the output of a Doppler bandpass filter 41 and having a threshold control terminal 43. The construction and arrangement of Schmitt triggers being well known in the art, element 42 is illustrated in block form only. There is also provided a low pass filter 44 responsively connected to the output of Doppler filter 41. As shown in FIGURE 8, the upper limit of the bandpass 19 of filter 44 is selected to be substantially limited to the lower frequency skirt of the bandpass 18 of Doppler filter 41. Therefore, the output of filter 44 will include the attenuated clutter energy in the Doppler filter output.

The output of filter 44 is operatively connected to the threshold control 43 of amplifier 42 for adjusting the threshold response thereof in accordance with the energy level input to filter 44. Interposed between Doppler filter 41 and Schmitt trigger 42 is signal delay and smoothing means 45 for providing a signal smoothed free of discrete sampling effects of the scan converter, and delayed by an amount corresponding to the delay provided by low-pass filter 44. In this way, the sampled range, represented by the Doppler signal and which is thresholded by the control signal on line 43, correctly corresponds to the range giving rise to such control signal.

In normal operation of the arrangement of FIGURE 7, the combined moving-target Doppler energy and lesser clutter energy in the Doppler filter output is applied to the input of Schmitt trigger 42. Trigger 42 responds only to as much of the input thereto as is in excess of the controlled threshold, to provide a pulse which is indicative of a moving target. Where the output of the Doppler filter 41 is limited to only the clutter energy, the threshold of the trigger 42, being adjusted in accordance with the level of such clutter energy, does not permit the Schmitt trigger to respond to such input, whereby no output pulse is provided. Such absence of an output pulse correctly indicates the absence of a moving-target producing a Doppler frequency above that of the bandpass 19 of filter 44.

Where an extremely small moving-target signal spectrum 217 occurs at a frequency near the upper limit of bandpass 18, the combined response of such signal and the clutter residue in the time domain may not be very much greater than the time-domain amplitude of the clutter residue itself. In other words, an extremely small target outside the clutter residue spectral region may not cause the output of element 45 to rise sufficiently above the Schmitt trigger threshold provided by the output of low pass filter 45. For such case, a further improvement may be made by employing the arrangement of FIGURE 9.

Figure 9:
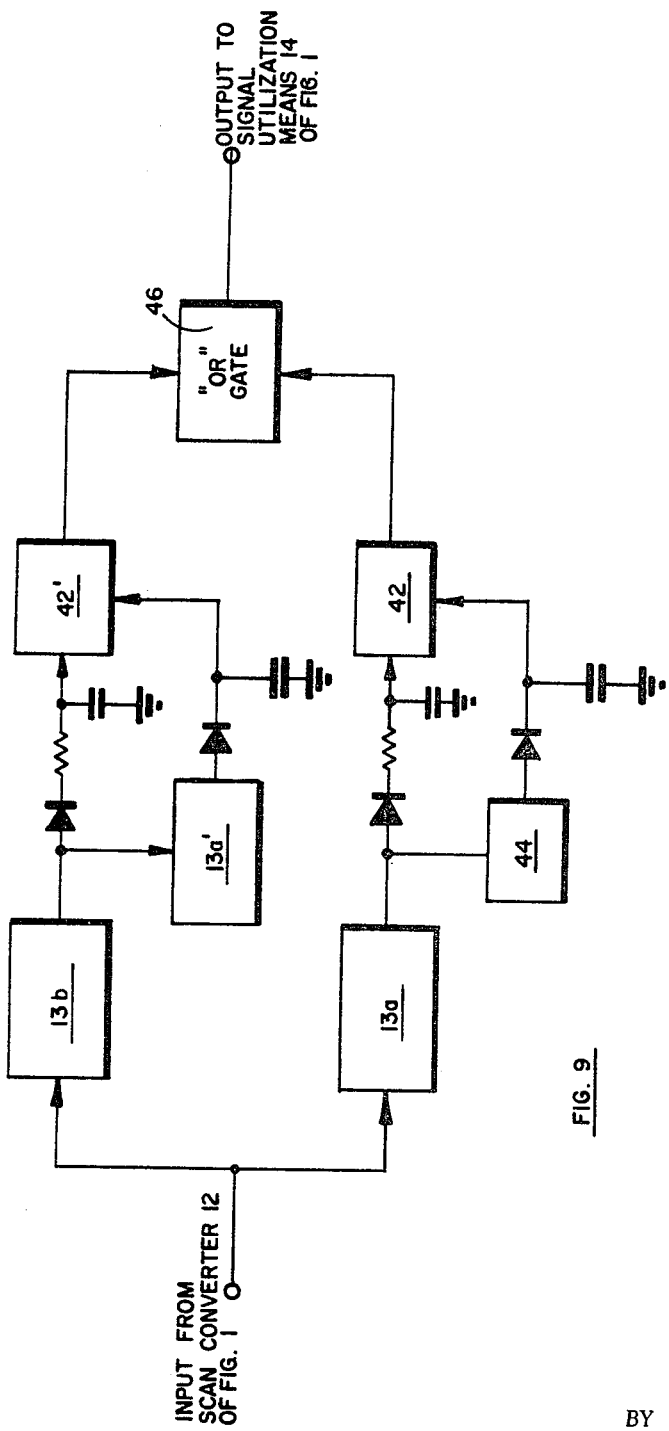
FIGURE 9 is a block diagram of an alternate embodiment of the Doppler filter arrangement of FIGURE 7.

Referring to FIGURE 9, there is illustrated a plurality or chain of two or more filters 13a and 13b commonly responsive to scan converter 12 (of FIGURE 1), and having more or less contiguous bandpasses 18a and 18b, the combined bandwidth thereof comprising bandpass 18, as shown in FIGURE 8. A separate threshold combination, corresponding to the arrangement of FIGURE 7, is operatively connected to each of filters 13a and 13b, and the outputs thereof combined at an "OR" gate 46 or like means known in the art for providing an output signal in response to the occurrence of one or more inputs thereto. Lower bandpass filter 13a and the filter 13a for thresholding the output of upper bandpass filter 13b are similarly arranged, having a common bandpass 18a, as shown in FIGURE 8. In this way, the threshold level for each component filter of the filter chain is more nearly related to the clutter spectral remnant occurring within the bandpass of the filtered output thereof.

Therefore, it is appreciated that the arrangements of FIGURES 7 and 9 provide means for improving the moving target indication provided by the device of FIGURE 1, whereby the lower corner frequency of the Doppler filter chain 13 may be made as low as practicable for extending the lower limit of minimum target speeds of distinguishable moving targets.

The upper limit of the distinguishable moving target spectra has been described as being limited to one-half the pulse repetition frequency (PRF) of the pulsed radar system. However, a means of quantitatively extending such limit is to provide time-shared dual pulse repetition frequencies in the radar system (as described, for example, in U.S. Patent No. 3,066,289, issued to Elbinger), and either use two separate portions of the scan converter or else two sets of scan converters, each gated to operate in synchronism with a mutually exclusive one of the time-shared PRF's, the bandpass of the common Doppler filter being designed for the lowest PRF with which it is intended to cooperate. The coaction between the high-speed target Doppler (normally outside the Doppler filter bandpass) and the second, higher PRF will result in a Doppler component, or beat frequency, which is within the filter bandpass. In this way, the fixed bandpass of the single common Doppler filter means is effectively extended for detecting Doppler velocities above the upper bandpass limit thereof.

Accordingly, there has been described improved clutter-referenced, range-sampling AMTI means employing a scan converter having mutually orthogonal read and write modes, whereby the cooperation therewith of only a single Doppler filter is required for processing all of the clutter-referenced range-sampled data to distinguish a moving target from ground clutter.

The exemplary arrangement shown in FIGURES 5 and 6 for the scan converter 12 of FIGURE 1 has been shown as providing a read-sweep frequency equal to an integer multiple (six) of the radar system PRF and a read-scan frequency equal to the radar PRF. Such representation was selected from convenience in illustrating (in FIGURE 6(g)) reconstruction of the clutter-reference spectral content of each of the sampled range increments. In practice, such an arrangement provides several practical difficulties in that (1) it is difficult to design a scan converter that can operate at such speed in cooperation with a radar for generating a desired data matrix of at least 150 columns of 150 pieces of data each (e.g., at least 22,500 data elements), (2) the erase-and-write mode and read mode would tend to mutually interfere, and (3) the frequency multiplicative effect of the read-scan speed of one PRF upon such desired number of data elements would represent a theoretical frequency (in the microwave region (which could not be processed by ordinary filter circuits. Accordingly, in a preferred embodiment of the arrangement of FIGURE 5, the read-sweep frequency is equal to the write-sweep frequency, and the read-scan frequency adjusted correspondingly to a submultiple of the PRF corresponding to the number of range increments to be sampled, as shown in FIGURE 10.

Figure 11A:
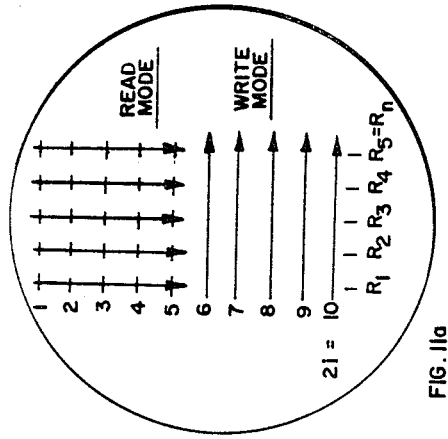
FIGURES 11a and 11b are illustrations of a representation dual data matrix resulting from the arrangement of FIGURE 10.
Figure 11B:
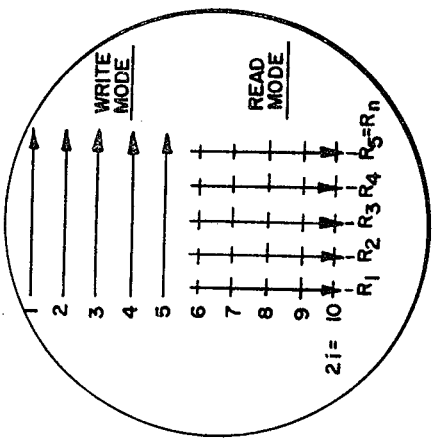

Referring to FIGURE 10, there is illustrated a preferred embodiment of the scan converter arrangement of FIGURE 5. The arrangement is adapted for providing a dual data matrix on a single storage tube, whereby alternately one part of the stored data matrix is being read and erased while the other part is being updated or rewritten, as indicated in FIGURES 11a and 11b.

Referring again to FIGURE 10, there are provided storage tube 21, write-scan generator 23a, write-sweep generator 24, read-sweep generator 31a and read-scan generator 32 generally arranged to functionally correspond to the like referenced elements of FIGURE 5. Both of sweep generators 24 and 31a, in FIGURE 10, however, commonly employ the system PRF as sweep frequencies. There is also provided a frame-time generator 48 comprising a frequency divider responsive to the system trigger for generating a read-scan frequency which is a submultiple ($1/n$) of the system PRF and corresponds to the number ($n$) of successive range increments to be sampled. The output of frequency divider 48 is operatively coupled to the input of read-scan generator 32. The construction and arrangement of frequency divider 48 is well known in the art, the usual arrangement employing a chain of bistable circuit elements such as flip-flops.

A 2:1 frequency divider 23b is responsively coupled to frame-time generator 48 and arranged to drive write-scan generator 23a at one-half the driving frequency at which read-scan generator 32 is driven, such lesser frequency having a periodicity representing an integer multiple ($i$) of the system pulse repetition period and corresponding to the number ($i$) of successive range traces to be stored.

The output of read-sweep generator 31a is biased at signal combining means 49 by a two-state bias signal having a total period corresponding to twice that of read-scan generator 32, the two signal states of which being mutually equal in duration. Such bias signal may be obtained from a flip-flop in the last stage of frequency divider 23b or by a flip-flop added to the last stage of generator 48 for such purpose, as is well understood in the art.

Figure 12:
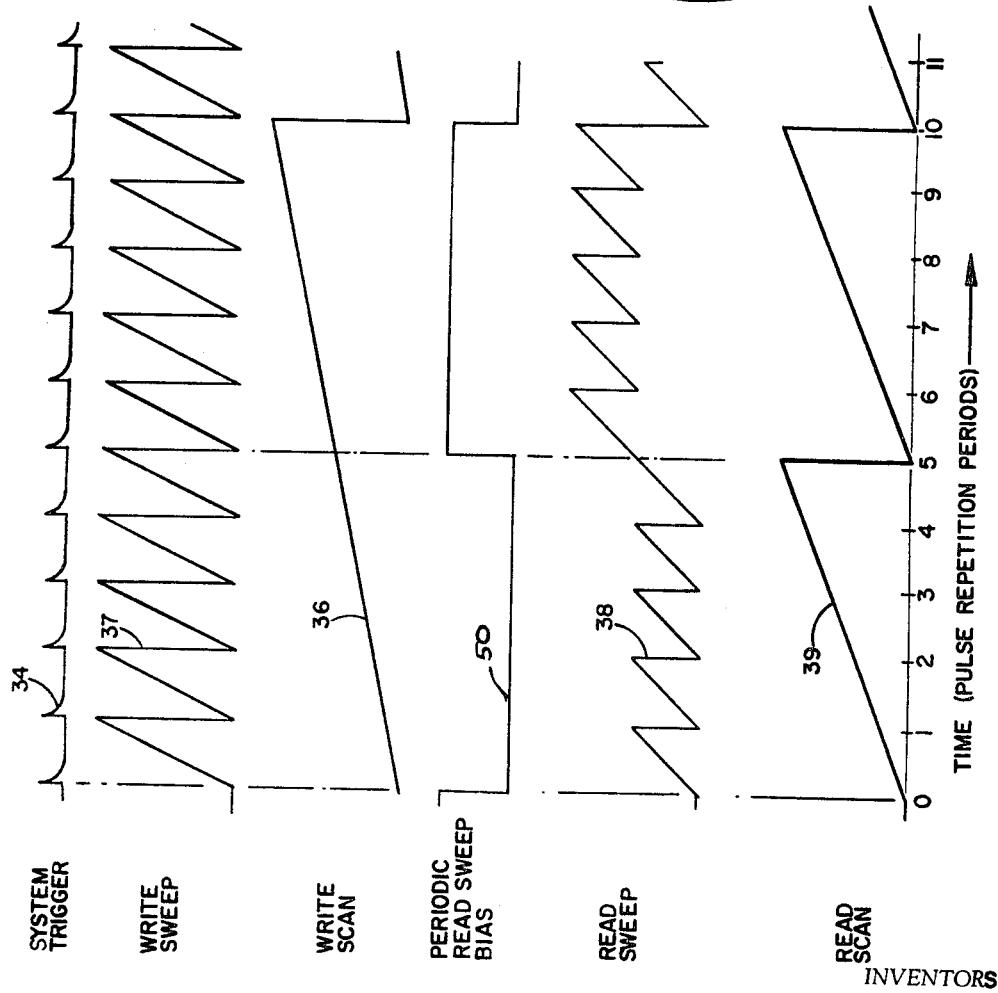
FIGURE 12 is a family of time-histories of the responses of several elements of FIGURE 10.

The operation of the arrangement of FIGURE 10 may be more easily appreciated from a consideration of FIGURES 11a, 11b and 12. Referring to FIGURE 12, curves 34, 36, 37, 38, 39, and 50 correspond to the time histories of the respective periodic outputs from the system trigger, write-scan generator 23a, write-sweep generator 24, summing means 49, read-scan generator 32, and the bias signal input to summing means 49. The write sweep 37 is seen to provide ten range-trace sweeps within one period of the write-scan curve 36 corresponding to the parallel array of ten horizontal range traces shown in each of FIGURES 11a and 11b. The read-sweep curve 38 is seen to provide five range-sample sweeps within one period of the read-scan curve 39, the read-sweep amplitude being adjusted to one-half the write-scan amplitude. Further, the amplitude envelope of read-sweep curve 38 is alternatively biased by the amount of such one-half amplitude on alternate cycles of the read-scan curve 39, by the amount of the bias curve 50. Such cooperation of the read-sweep and read-scan responses 38 and 39 correspond to the five vertical sweeps of alternate (top and bottom) halves of the parallel array of ten horizontal range traces shown in FIGURES 11a and 11b, the cooperation of read mode response curves 38 and 39 during pulse repetition periods 0–5 in FIGURE 12 corresponding to the "read" mode shown at the botom half of FIGURE 11b. The cooperation of the read-mode curves 38 and 39 during pulse repetition periods 5–10 in FIGURE 12, corresponds to the "read" mode shown at the top half of FIGURE 11a.

Although only five range traces ($i=5$) and five sampled range increments ($n=5$) are shown in the illustration of FIGURES 11a, 11b and 12 (representing a data matrix of ($ni$) or 25 elements), it is to be appreciated that many more data elements may be employed, as desired, by merely increasing the frame time provided by generator 48 of FIGURE 10. For the above described examle of an azimuth-scanning radar system, the number ($i$) of range traces selected corresponds to the number of pulse repetition periods required for the radar to azimuthally scan over one beamwidth of the antenna ($i=150$) having been indicated as a representative number.

For the square data matrix illustrated in FIGURE 12 ($i=n$), the use of 150 range trace lines would also result in the use of 150 sampled range increments ($\Delta r$). For a desired range increment, or range bin, of ($\Delta r=500$ feet), the corresponding range interval over which range-sampling is conducted would be $n\Delta r$ or 75,000 feet (approximately 14 miles).

By means of the arrangement of FIGURE 10, a lower read-sweep frequency is empolyed, which is well within the state of the art. Further, such lower sweep frequency (equal to the system PRF) results in a lower frequency multiplication ($K_f$) of the clutter-referenced spectra, representing frequency ranges usual to the art of filter design practices (for design of Doppler filter 13).

Moreover, the arrangement of FIGURE 10 provides non-interference between the "read-erase" and "write" modes of the storage tube 21. For example, after the "write" mode has written the first five range traces (top half of FIGURE 11b and pulse repetition periods 0–5 in FIGURE 12) and continues to write the last five range traces (bottom half of FIGURE 11a and pulse repetition periods 5–10 in FIGURE 12), the "read" mode "reads"

the first half of the stored range traces (top half of FIGURE 11a). The combination of such "read" action plus the storage delay occurring over the subsequent delay time (until rewrite occurs), effectively erases the first five stored range traces (indicated by the dotted horizontal lines in the top half of FIGURE 11a). Upon the synchronous completion of the "read" mode scan of such first five stored range traces and the write-mode storage of the last (tenth) range trace (FIGURE 11a and pulse repetition period 10 in FIGURE 12), the "write" mode commences to rewrite a new first range trace (period 11 in FIGURE 12), while the "read-and-erase" mode is performed on the last five stored range traces (bottom half of FIGURE 11b).

Where such lower read-scan speed is used, however, a corresponding slower range-trace results. In other words, the periodicity of the resulting range trace output signal (indicative if only moving target) is an integer multiple ($i$) of the periodicity of the radar system trigger. Therefore, where the signal utilization means 14 of FIGURE 1 comprises a PPI type display indicator, the range sweep thereof would be synchronized with read-scan generator 32 of FIGURE 10 and made similarly responsive to frame time generator 48. Alternatively, the output of scan generator 32 might be suitably scaled (amplified or attenuated as necessary) and employed for the range sweep signal of the PPI indicator.

Although the concept of the invention has been described in terms of application to preferably a non-coherent radar system for providing a clutter-referenced signal spectra, the concept of the device is not necessarily so limited. For example, non-coherent radar 10 and video detector 11 of FIGURE 1 may be replaced with a synthetic coherent receiver system employing a stored clutter sample as a synthetic reference such as is described, for example, in U.S. patent application Ser. No. 389,299 filed Aug. 13, 1964, by Carl A. Wiley, assignor to North American Aviation, Inc., assignee of the subject invention. Further, the described arrangement of scan-converter means 13 and single Doppler filter chain 13 may even be made to cooperate with a prior-art coherent receiver having platform velocity compensation means and providing a bipolar video output. Moreover, although, the embodiment of invention has been illustratd in a radar system, the concept of the invention is not so limited, the invention being equally applicable to the processing of other types of signals.

Accordingly, scan converter means is adapted to be responsive to a source of periodic signals for read-sweeping corresponding portions of a selected number of such signals and bandpass filter means, responsively coupled to the scan-converter means, employs a selected bandpass equal to a bandpass coextensive with a spectral content of interest, multiplied by the ratio of the scan converter read-sweep speed to the scan converter write-scan speed. By means of such cooperation, scan converter means in cooperation with bandpass filter means may be employed to process correponding portions of periodic signals for providing a periodic output indicative of selected spectral components of the spectral content of each of such corresponding portions.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for detecting the presence of a selected spectral content in corresponding portions of a cyclically occurring time-varying signal, comprising
a scan converter adapted to be responsive to a source of cyclical signals for sequentially sweeping corresponding portions of successive ones of said signals, and
bandpass filter means responsively coupled to said scan converter and having a bandpass corresponding to said selected spectral content.

2. Means for detecting the presence of a selected spectral content in corresponding portions of a cyclically-occurring signal, comprising
scan-converter means having a write-scan speed and read-sweep speed and adapted to be responsive to a source of periodic signals for successively read-sweeping corresponding portions of a selected number of successive ones of said periodic-signal signals, and
bandpass filter means responsively coupled to said scan converter and having a selected bandpass equal to a bandpass coextensive with said spectral content of interest multiplied by a frequency multiplicative factor corresponding to the ratio of the read-sweep speed to the write-scan speed of said converter.

3. In a pulsed radar system, means for indicating moving targets comprising
signal storage means responsive to said radar system for storing signals received from targets at various ranges for each of a selected number of successive pulse repetition periods;
scanning means responsive to said signal storage means for sequentially scanning successive ones of said stored signals for a selected range to provide an output signal; and
a bandpass Doppler filter responsive to said output signal for providing a signal having a spectral content indicative of the presence of a moving target.

4. Means for processing reflected signals of a pulse radar, said means comprising means for recording the range trace signals for each of successive echoes received from a plurality of transmitted radar pulses; means for sequentially scanning the portion of successive ones of said recorded signals representing a corresponding range, for a plurality of ranges; and a filter means responsive to said scanning means, said filter means providing signals indicating moving targets.

5. In a non-coherent pulsed radar system, means for indicating moving targets comprising
signal storage means responsive to said radar system and arranged for severally storing signals received for each of a selected number of successive pulse repetition periods as a parallel array of linear range traces;
scanning means responsive to said signal storage means for sequentially scanning said linear traces at a common selected range increment to provide a time-varying output signal indicative of the spectral content of the detected signals corresponding to said scanned range increment; and
a high-frequency bandpass filter responsive to said output signal from said scanning means for providing a signal indicative of the presence of a moving target.

6. In a non-coherent pulsed radar system, means for indicating moving targets comprising
signal storage means responsive to said radar system and arranged for severally storing signals received for each of a selected number of successive pulse repetition periods as a parallel array of linear range traces;
scanning means responsive to said signal storage means for sequentially scanning said linear traces at a common selected range increment to provide a time-varying output signal indicative of the spectral content of the detected signals corresponding to said scanned range increment;
control means responsive to said radar system for progressively adjusting said scanning means to progressively scan successive range increments of said linear traces; and
a high-frequency bandpass Doppler filter responsive to said output signal from said scanning means for providing a signal indicative of the presence of a moving target.

7. In a non-coherent pulsed radar system, means for indicating moving targets comprising signal storage means responsive to said radar system and arranged for severally storing unipolar-video detected signals received for each of a selected number of successive pulse repetition periods as a parallel array of linear range traces;

scanning means responsive to said signal storage means for sequentially scanning said linear traces at a common selected range increment to provide a time-varying output signal indicative of the spectral content of the detected signals corresponding to said scanned range increment;

control means responsive to said radar system for progressively adjusting said scanning means to progressively scan successive range increments of said linear traces;

a high-frequency bandpass filter responsive to said output signal from said scanning means for providing a signal indicative of the presence of a moving target; and signal utilization means responsive to said filter and to said radar system indicating the range and direction of said moving target.

8. In a non-coherent pulsed radar system adapted for airborne use, improved means for distinguishing small moving targets, comprising a scan-converter having mutually orthogonal read and write modes, and adapted to be responsive to said radar system for storing the range trace signals received for a selected number of successive pulse repetition periods as a parallel array;

signal processing means responsive to signals received by said radar system and comprising said scan-converter for sequentially range-sampling successive ones of said stored array of received signals to provide an output signal having a clutter-reference spectral content; and clutter-reduction means responsive to said received signals and comprising said scan-converter and a Doppler filter having a selected high frequency bandpass and responsively coupled to said scan-converter for providing a signal indicative of a detected moving-target.

9. The device of claim 8 wherein there is further provided signal utilization means responsive to said radar system and said Doppler filter for displaying the direction and range of said moving targets.

10. In a pulsed radar system adapted for airborne use, means for distinguishing small moving targets comprising clutter-referenced signalling means comprising unipolar video detection means responsive to said received signals and a scan-converter responsively coupled to said video detection means for storing in a parallel array signals received during a selected number of successive pulse repetition periods to provide an array of stored signals having a clutter-referenced spectral content indicative of a target Doppler plus ground clutter content of said received energy;

range-sampling means sequentially responsive to successive ones of said stored array of signals for providing range-sampled clutter-referenced signals and comprising said scan converter responsively coupled to said radar system for sampling portions of said array of signals corresponding to successive range increments; and a Doppler filter responsive to said range-sampled clutter-referenced signal and having a selected high frequency bandpass for providing a time-varying output signal substantially indicative of only moving targets sensed within said successive range increments.

11. In a pulsed radar system adapted for airborne use, improved means for indicating small moving targets comprising unipolar video detection means responsive to a receiver of said radar system for providing range trace signals which are clutter-referenced to the clutter at each range producing a received signal and comprising clutter plus target Doppler spectral components; and scan-converter means having mutually orthogonal read and write modes and responsive to said video detection means for sequentially scanning successive ones of a selected number of said range trace signals at successive range-samples to provide a time-varying output signal indicative of the range and clutter-referenced spectral content of said selected number of range-sampled signals;

a Doppler filter responsive to said scan-converter and having a selected high frequency bandpass the upper frequency of which corresponds to one-half the pulse repetition frequency component of said output signal of said scan converter means, for reducing the clutter remnant of the target Doppler plus clutter spectra in the time-varying signal from said scan-converter means; and signal utilization means responsive to said radar system and said filter for indicating the range and direction of an object producing said Doppler component signal.

12. In a pulsed radar system adapted for airborne use and having a system trigger, improved means for distinguishing small moving targets from ground clutter and noise comprising unipolar video detection means responsive to a receiver of said radar system for providing a clutter-referenced range trace signal comprising clutter plus target Doppler spectral components;

scan-converter means having mutually orthogonal read and write modes and responsive to said video detection means and the system trigger of said pulsed radar system for storing said received signals in a parallel array of a selected number of sequential range traces and sequentially scanning successive ones of a selected number of said range trace signals at successive range samples to provide a time varying output signal indicative of the range and spectral content of said selected number of clutter-referenced range-sampled signals;

Doppler filter means responsive to said scan converting means and having a selected high frequency bandpass the upper corner frequency of which is equal to one-half the pulse repetition frequency of said system trigger and multiplied by the ratio of the read-sweep frequency of said scan-converting means to the write-scan frequency thereof; and signal utilization means responsive to the output of said filter and the read-scan frequency of said scan converting means for indicating the range of an object producing said Doppler component signal.

13. The device of claim 12 in which there is further provided variable threshold signalling means for limiting the response of said signal utilization means to energy occurring near the lower corner frequency of said Doppler filter means.

14. The device of claim 12 in which there is further provided a threshold amplifier interposed between the output of said Doppler filter means and the input of said signal utilization means and having a threshold control input; and a threshold filter connected to the output of said Doppler filter means and having a selected bandpass corresponding to the lower corner frequency of the bandpass of said Doppler filter, said control input of said threshold amplifier being responsively coupled to the output of said threshold filter, whereby the response of said signal utilization means to that portion of the ground clutter spectra common to said Doppler filter bandpass is prevented.

15. The device of claim 12 in which said Doppler filter means is comprised of an "OR" gate;
- a plurality of Doppler filters having more or less contiguous bandpasses and having outputs commonly coupled to said "OR" gate;
- a plurality of threshold signalling means corresponding to the number of Doppler filters, each signalling means interposed between said "OR" gate and a mutually exclusive one of said Doppler filters; and
- a plurality of threshold filters, each interconnecting the output of a mutually exclusive one of said Doppler filters and a corresponding one of said signalling means, the upper bandpass skirt of each said threshold filter corresponding to the lower bandpass skirt of an associated Doppler filter.

16. In a non-coherent pulsed radar system adapted for airborne use, improved means for distinguishing small moving targets, comprising
- unipolar video detection means responsive to signals received by said radar system for providing a clutter-referenced periodic range trace signal;
- a scan-converter responsive to said detection means and said radar system and arranged for scan-writing a selected number of successive ones of said range trace signals as a parallel array, and then scan-reading said array in a direction orthogonal to the direction of said scan writing for providing a range-sampled output signal for successive range increments and having a clutter-referenced spectral content indicative of the clutter plus Doppler-shifted moving target components of reflections received from a sampled range; and
- a single Doppler filter responsive to said scan converter and having a high frequency bandpass for rejection of said clutter component, the upper corner frequency of said bandpass corresponding to one-half the pulse repetition frequency of said pulsed radar system.

References Cited
UNITED STATES PATENTS

| | | | |
|---|---|---|---|
| 2,535,274 | 12/1950 | Dicke | 343—7.7 |
| 2,600,255 | 6/1952 | McConnell | 343—7.7 |
| 3,127,605 | 3/1964 | Alderson | 343—7.7 |

RODNEY D. BENNETT, *Primary Examiner.*

C. L. WHITHAM, *Assistant Examiner.*